US008988352B2

(12) United States Patent
Wang et al.

(10) Patent No.: US 8,988,352 B2
(45) Date of Patent: Mar. 24, 2015

(54) MOUSE HAVING POP-UP MECHANISM

(71) Applicants: Fu Tai Hua Industry (Shenzhen) Co., Ltd., Shenzhen (CN); Hon Hai Precision Industry Co., Ltd., New Taipei (TW)

(72) Inventors: Hua-Yong Wang, Shenzhen (CN); Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 26 days.

(21) Appl. No.: 13/849,605

(22) Filed: Mar. 25, 2013

(65) Prior Publication Data

US 2013/0249798 A1 Sep. 26, 2013

(30) Foreign Application Priority Data

Mar. 26, 2012 (CN) .......................... 2012 1 0081246

(51) Int. Cl.
*G09G 5/08* (2006.01)
*G06F 3/033* (2013.01)
*G06F 3/0354* (2013.01)

(52) U.S. Cl.
CPC ............ *G06F 3/033* (2013.01); *G06F 3/03543* (2013.01); *G06F 2203/0333* (2013.01)
USPC ........................ 345/163; 463/37; 361/679.18

(58) Field of Classification Search
CPC ... G06F 3/033; G06F 3/0354; G06F 3/03543; G06F 2203/0332; G06F 2203/0333
USPC .................. 345/163–167; 463/37; 361/679.1, 361/679.18, 679.19
See application file for complete search history.

(56) References Cited

U.S. PATENT DOCUMENTS

| 5,433,407 | A  | * | 7/1995  | Rice ........................... 248/118.1 |
| 5,912,660 | A  | * | 6/1999  | Gouzman et al. ............. 345/163 |
| 2003/0103040 | A1 | * | 6/2003  | Koike et al. .................... 345/163 |
| 2005/0253811 | A1 | * | 11/2005 | Hiromori ....................... 345/163 |
| 2007/0035520 | A1 | * | 2/2007  | Hsu ............................... 345/163 |
| 2007/0222063 | A1 | * | 9/2007  | Hsu ............................... 257/704 |
| 2007/0222754 | A1 | * | 9/2007  | Chen et al. .................... 345/163 |
| 2008/0225004 | A1 | * | 9/2008  | Hsieh et al. ................... 345/163 |
| 2012/0319955 | A1 | * | 12/2012 | Kim ............................... 345/163 |
| 2013/0009874 | A1 | * | 1/2013  | Chun-Che ..................... 345/166 |

* cited by examiner

*Primary Examiner* — Tom Sheng
(74) *Attorney, Agent, or Firm* — Novak Druce Connolly Bove + Quigg LLP

(57) ABSTRACT

An exemplary embodiment of a mouse includes a main body, a pop-up mechanism received in the main body, and a cap. The shell defines a first through hole. The cap is fixed to the pop-up mechanism and received in the first through hole. The cap can be lifted up to protrude or be retracted in the body of the mouse via an external force, the lifting up and the retraction of the cap cause the shape of the hand gripping the mouse to change, preventing fatigue in the hand.

19 Claims, 7 Drawing Sheets

MOUSE HAVING POP-UP MECHANISM

BACKGROUND

1. Technical Field

The present disclosure generally relates to hand-held mice for controlling the movement of a cursor.

2. Description of Related Art

The mouse as a hand-held device is ergonomically designed to fit in human hands. A mouse communicates with a computer and is configured to slidably move across a flat, stationary surface to control the cursor displayed on a screen of the computer, with buttons for entering commands to the computer. Prolong grasping of the mouse may result in fatigue, discomfort, and even pain in the hand and wrist associated with carpal tunnel syndrome.

What is needed, therefore, is a means which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Reference will be made to the drawings to describe various embodiments.

Figure 1:
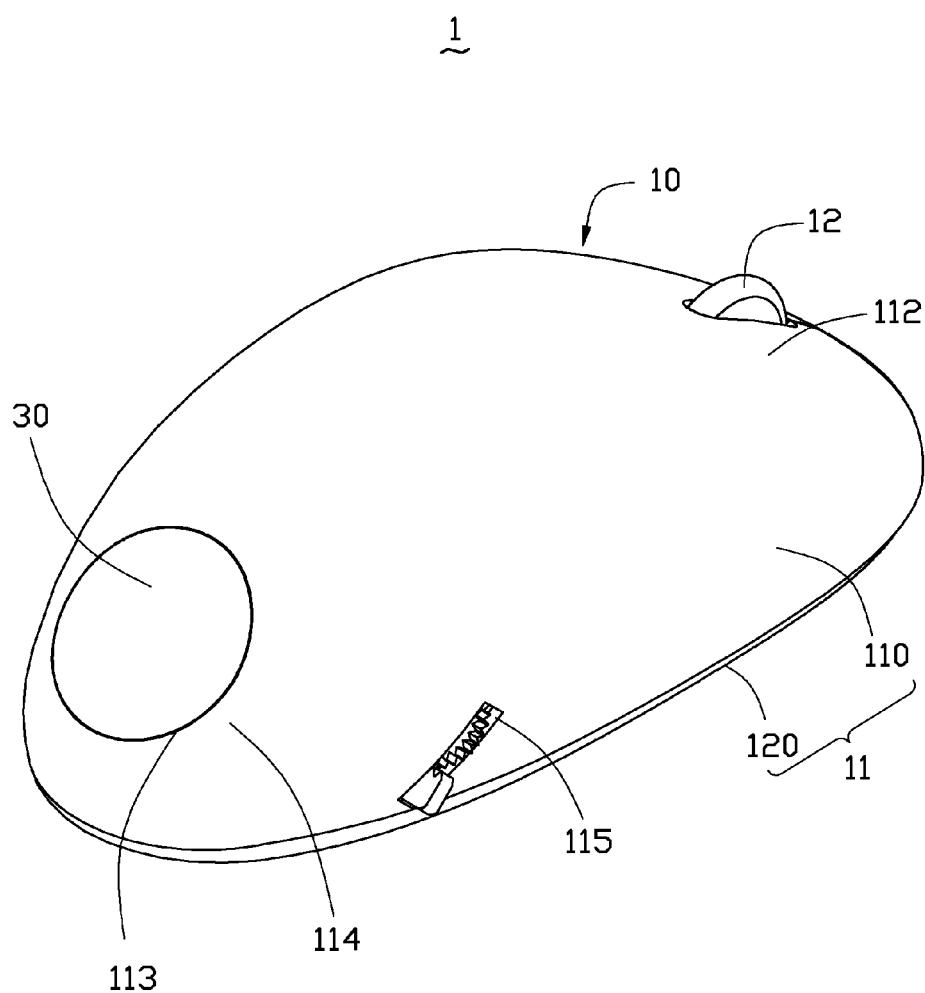
FIG. 1 is an isometric view of a mouse according to a first embodiment of the disclosure, the mouse including a main body, a cap and a pop-up mechanism.

Referring to FIG. 1, in one embodiment, a mouse 1 includes a main body 10, a pop-up mechanism 30 received in the main body 10, and a cap 31 (see FIG. 3) fixed to the pop-up mechanism 30. The main body 10 defines a first through hole 113. The cap 31 is movably received in the first through hole 113. The mouse 1 can be in a first (closed) state or a second (opened) state. When the mouse 1 is in the first state, the cap 31 is retracted in the first through hole 113, and cooperates with the main body 10 to present the outline of a normal mouse for optimally fitting the grasp of a user's hand. When the mouse 1 is in the second state, the cap 31 protrudes from the main body 10 via the first through hole 113, providing an obstacle to the normal grip, so as to force the user's hand to change the manner of grasping the mouse 1.

Figure 2:
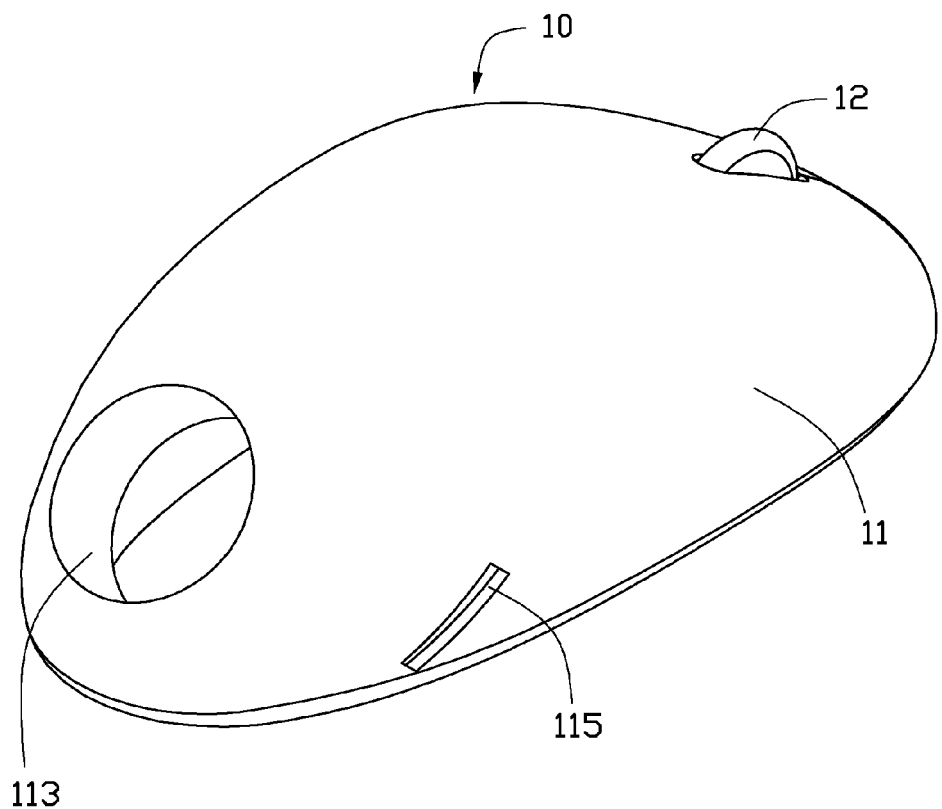
FIG. 2 is an isometric view of the main body of the mouse of FIG. 1.

Referring also to FIG. 2, the main body 10 includes a shell 11, a mouse button 12, and circuit elements (not shown) received in the shell 11. The circuit elements are configured for realizing the basic functions of the mouse 1, such as controlling the cursor. The shell 11 includes a top cover 110 and a bottom cover 120, the bottom cover 120 and top cover 110 engage with each other to define an accommodating space (not labeled), and the circuit elements and the pop-up mechanism 30 are received in the accommodating space. The bottom cover 120 includes a flat plate to slide about on a flat, stationary surface.

The top cover 110 has a shape for optimally fitting the grasp of the hand, and includes a first end 112 and a second end 114 opposite to the first end 112. The mouse button 12 is fixed at the first end 112 of the top cover 110. The top cover 110 defines the first through hole 113 at the second end 114 and two second through holes 115 located at opposite sides of the first through hole 113.

Figure 3:
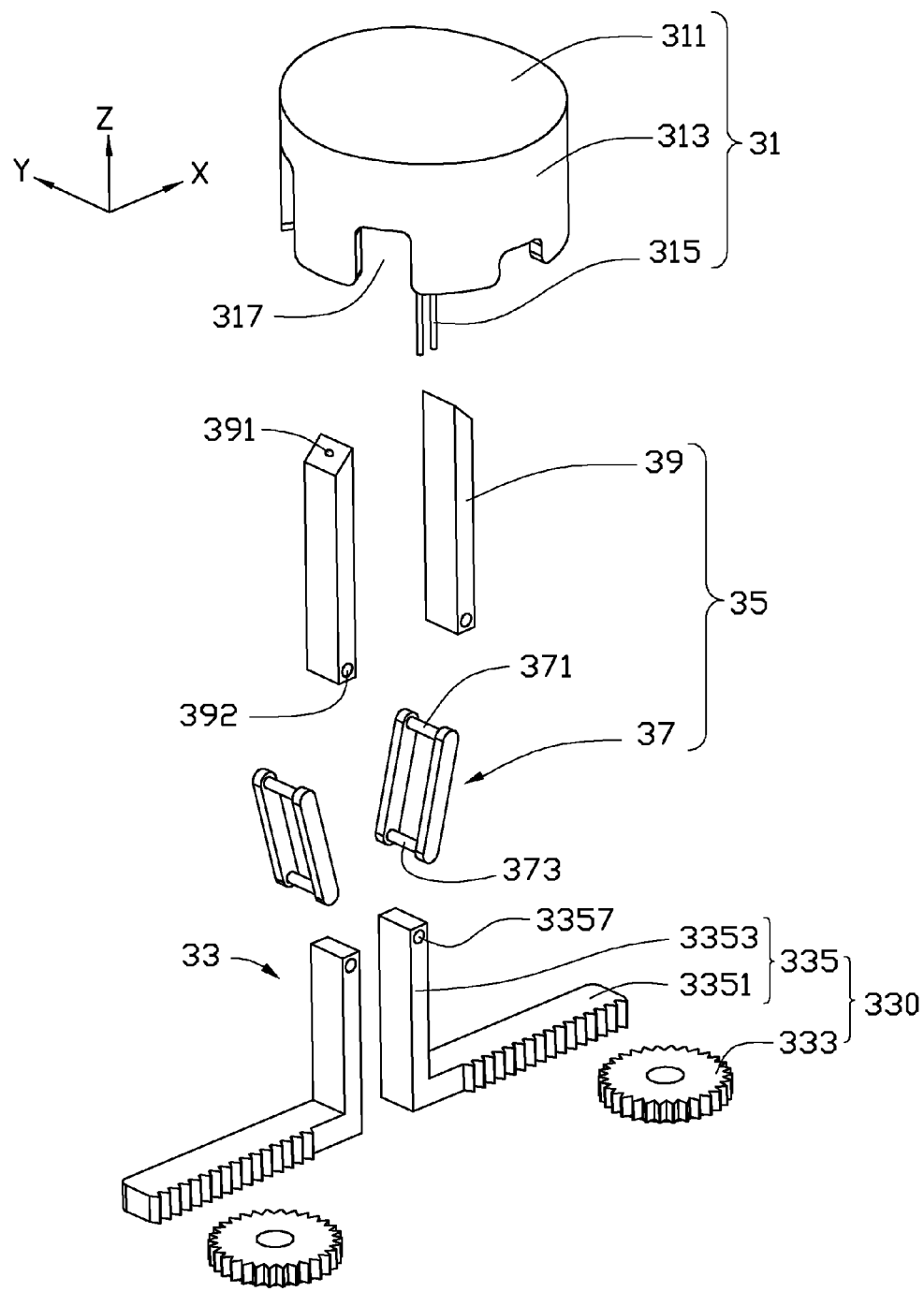
FIG. 3 is an exploded, isometric view of the cap and the pop-up mechanism of the mouse of FIG. 1.

Referring also to FIG. 3, the cap 31 moves back and forth along a first direction parallel to a Z-axis as shown in FIG. 3. The cap 31 includes a top plate 311, a sidewall 313 extending from a peripheral edge of the top plate 311 to the pop-up mechanism 30 along the first direction, and two fixing rods 315 extending from an inner surface of the top plate 311 to the pop-up mechanism 30 along the first direction. The sidewall 313 defines a plurality of cutouts 317, and the openings of the cutouts 317 face towards the pop-up mechanism 30.

The pop-up mechanism 30 includes a telescoping mechanism 35 and a transmission mechanism 33. In the embodiment, the telescoping mechanism 35 includes two supporting rods 39 and two connecting rods 37. Each supporting rod 39 defines a fixing through hole 391 at a first distal end of the supporting rod 39 and a first axle hole 392 at a second distal end opposite to the first distal end. The fixing through holes 391 extend along the first direction, the first axle holes 392 extend along a second direction perpendicular to the first direction, and the second direction is a direction parallel to a Y axis as shown in FIG. 3. Each connecting rod 37 includes two parallel spindles 371, 373, and the two spindles 371, 373 are located at opposite sides of the connecting rod 37.

The transmission mechanism 33 includes two transmission parts 330. Each transmission part 330 includes a gear 333 and a rack 335. The gear 333 includes a number of first teeth extending from a periphery of the gear 333. The rack 335 includes a first rack portion 3351 extending along a third direction perpendicular to the first and second directions and a second rack portion 3353 extending along the first direction, and the third direction is a direction parallel to an X axis as shown in FIG. 3. The first rack portion 3351 connects to the second rack portion 3353, thereby forming an L-shaped structure. The first rack portion 3351 includes a number of second teeth, and the second teeth mesh with the first teeth of the gear 333. When the gears 333 rotate, the pair of racks 335 move back and forth along the third direction, such that the pair of racks 335 move closer to each other or move further away from each other. The second rack portion 3353 defines a second axle hole 3357 at a distal end thereof farthest from the first rack portion 3351.

Figure 4:
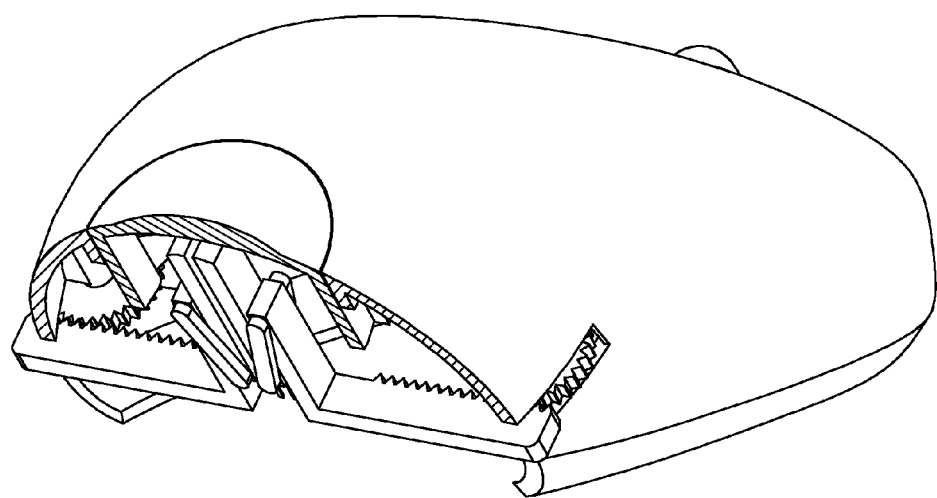
FIG. 4 is an assembled view of the mouse of FIG. 1, with the pop-up mechanism retracted in the main body.

Referring also to FIG. 4, in assembly of the mouse 1, the pop-up mechanism 30 is received in the shell 11. The gears 333 are rotatably fixed in the shell 11 via shafts (not shown), with some of the second teeth protruding out of the shell 11 via the second through holes 115 of the shell 11. The first teeth of the gears 333 mesh with the second teeth of the first rack portions 3351. Distal ends of the first rack portions 3351 protrude out of the shell 11 via the second through holes 115. The connecting rods 37 are rotatably attached to the second rack portion 3353 by the spindles 371 rotatably fixed in the second axle holes 3357 of the second rack portion 3353. The connecting rods 37 are rotatably attached to the supporting rods 39 by the spindles 373 rotatably fixed in the first axle holes 392 of the supporting rods 39. The connecting rods 37 are located between the second rack portions 3353 of the racks 335, and the supporting rods 39 are located between the connecting rods 37. The cap 31 is received in the first through hole 113, and fixed to the supporting rods 39 by the fixing rods 315 of the cap 31 which are fixed in the fixing through hole 391 of the supporting rods 39.

In the first state of the mouse 1, a portion of the first rack portion 3351 protruding out from the shell 11 via the second through hole 115 is the shortest. The first teeth of the gears 333 mesh with the second teeth of the first rack portions 3351 nearest the distal end thereof. The second rack portions 3353 are closest to each other. The supporting rods 39 are closest to the bottom cover 120 of the shell 11. The cap 31 is retracted in the first through hole 113, and the top plate 311 cooperates with the top cover 110 to create the optimal surface shape of the mouse 1 for the user to grasp.

Figure 5:
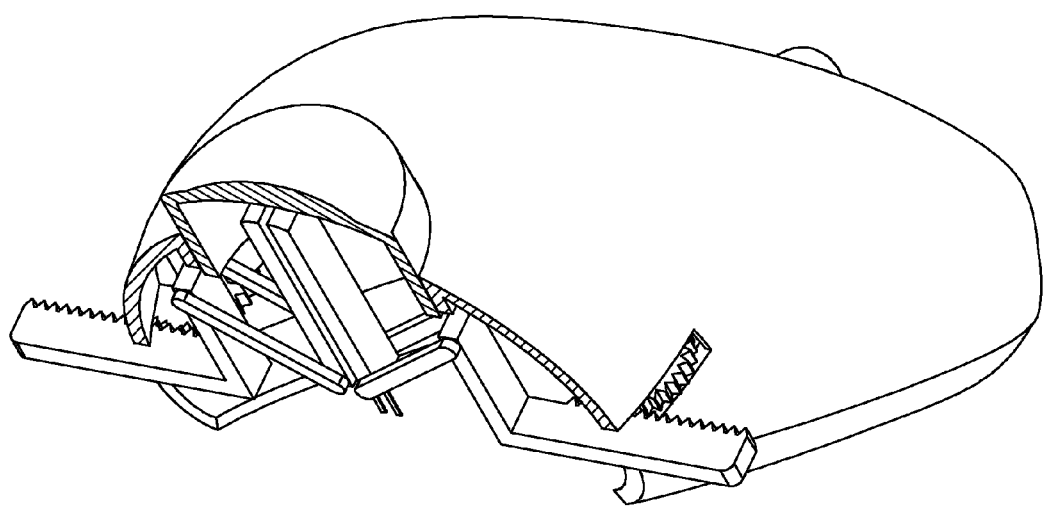
FIG. 5 is an assembled view of the mouse of FIG. 1, with the pop-up mechanism protruding out of the main body.

Referring also to FIG. 5, when using a fingertip to rotate the portion of the gears 333 protruding out from the shell 11, the gears 333 rotate so as to change the first state of the mouse 1 to the second state. In detail, when the gears 333 rotate towards each other, the racks 335 are driven to move further away from each other. Because the connecting rods 37 are rotatably attached to the second rack portions 3353 of the racks 335, and the connecting rods 37 are rotatably attached to the supporting rods 39, when the racks 335 moves further away from each other, the racks 335 drive the connecting rods 37 to rotate and thus drive the supporting rods 39 to move towards the cap 31 along the first direction. The cap 31 moves in unison with the supporting rods 39, such that the cap 31 is lifted up and protrudes out from the shell 11, and thereby exerts a gentle force to the palm of the user, changing the shape of the hand of the user grasping the mouse 1, and helping the user to relax the hand.

The mouse 1 is returned to the first state by action of another push applied to the gears 333. The external push drives the gears 333 to rotate oppositely. Then, the racks 335 move closer to each other and the cap 31 retracts into the shell 11. In addition, the user can also push the first rack portions 3351 to make the racks 335 move closer to each other, so that the cap 31 is retracted in the shell 11. The cap 31 can also be directly pushed down into the shell 11 via the first through hole 113.

With the above-described configuration, the cap 31 can protrude out of the shell 11 and retract into the shell 11, so as to enforce a change in the grip of the gesture while grasping the mouse 1, thereby postponing the onset of any fatigue of the hand.

Figure 6:
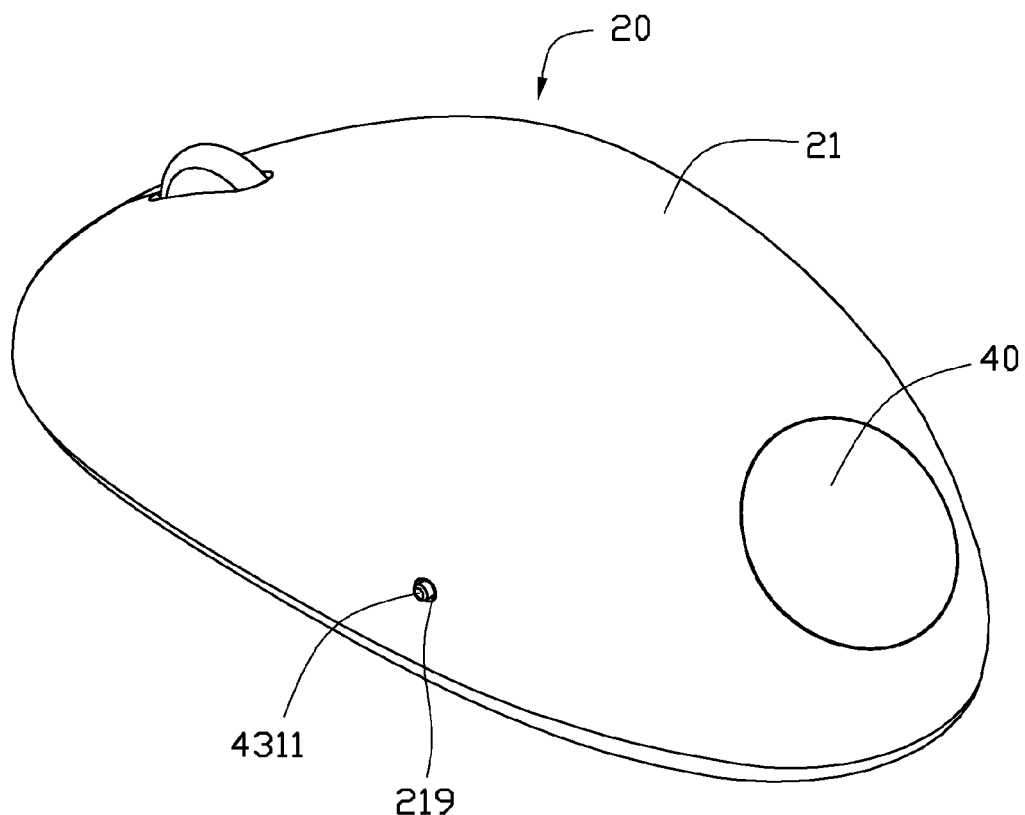
FIG. 6 is an isometric view of a mouse according to a second embodiment of the present disclosure.
Figure 7:
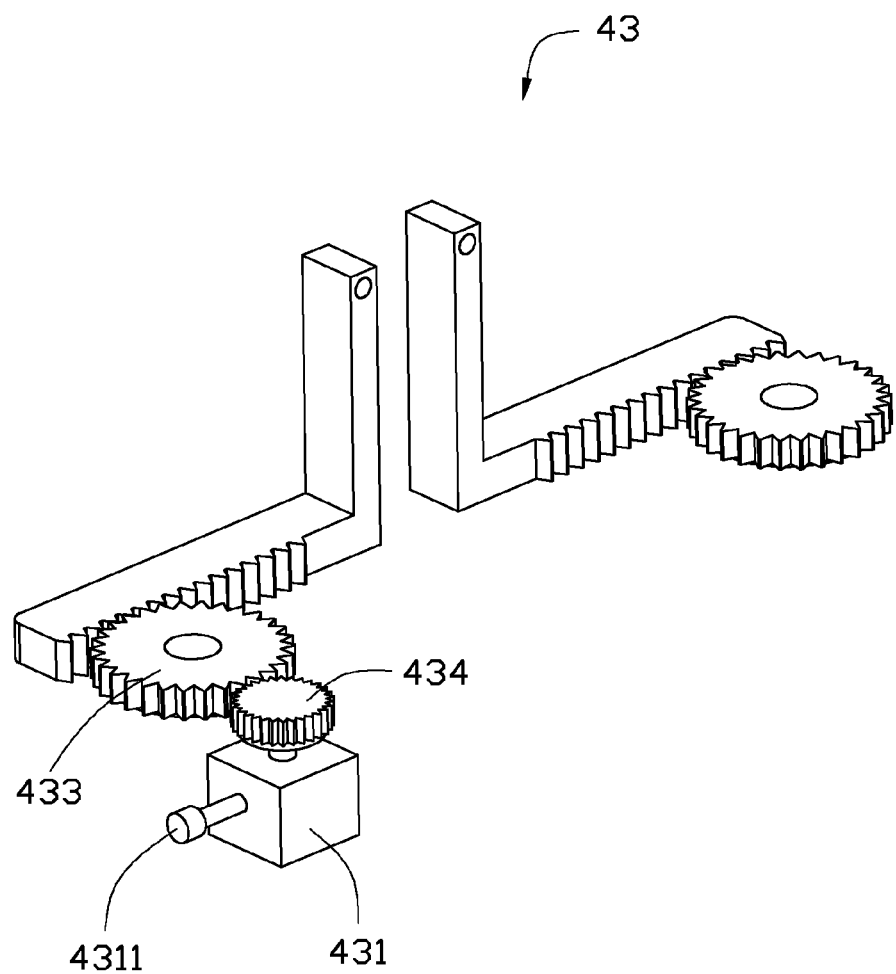
FIG. 7 is a partial assembled view of the pop-up mechanism of the mouse of FIG. 6.

Referring to FIGS. 6-7, a mouse according to a second embodiment of the present disclosure is shown. The mouse has a similar structure to the mouse 1 except that a second gear 434 which is driven by a motor 431 meshes with the first gear 433. The second gear 434 drives the first gear 433 to rotate. A switch 4311 of the motor 431 controls the rotation direction of the second gear 434, and the switch 4311 protrudes out from the shell 21 via a third through hole 219. When the switch is pressed down one step, the second gear 434 rotates clockwise, and when the switch is pressed down two steps, the second gear 434 rotates counterclockwise.

It is believed that the present embodiments and their advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:

1. A mouse, comprising:
   a main body comprising a shell with a first through hole defined in the shell;
   a pop-up mechanism received in the shell; and
   a cap fixed to the pop-up mechanism and movably received in the first through hole;
   the cap comprising a top plate, a sidewall extending from a peripheral edge of the top plate to the pop-up mechanism along a first direction, and two fixing rods extending from an inner surface of the top plate to the pop-up mechanism along the first direction, the sidewall defines a plurality of cutouts, and openings of the cutouts opposite to the first through hole;
   wherein the mouse is capable of being adjusted to be in a first state or a second state via an external force; in the first state, the cap is retracted in the first through hole; in the second state, the cap is protruded out of the shell via the first through hole.

2. The mouse of claim 1, wherein the shell comprises a top cover and a bottom cover engaging with each other to receive the pop-up mechanism, the bottom cover comprises a flat plate to slide about on a flat, stationary surface, and the top cover comprises a shape for optimally fitting the grasp of a user's hand.

3. The mouse of claim 2, wherein the top cover comprises a first end and a second end opposite to the first end, a mouse button is fixed at the first end, and the top cover defines the first through hole at the second end.

4. The mouse of claim 3, wherein the pop-up mechanism comprises a telescoping mechanism and a transmission mechanism, the transmission mechanism is configured to receive the external force, and drive the telescoping mechanism to lift up the cap such that the cap protrudes out of the shell via the first through hole along the first direction or pull down the cap such that the cap retracts in the first through hole along the first direction.

5. The mouse of claim 4, wherein the telescoping mechanism comprises two supporting rods extending along the first direction and two connecting rods, each supporting rod defines a fixing through hole extending along the first direction at a first distal end thereof and a first axle hole extending along a second direction perpendicular to the first direction at a second distal end thereof, each connecting rod comprises two parallel spindles located at opposite sides of the connecting rod, the spindles extend along a second direction perpendicular to the first direction, the cap is fixed to the supporting rods by the fixing rods of the cap fixing in the fixing through hole of the supporting rods.

6. The mouse of claim 5, wherein the transmission mechanism comprises two transmission parts, each transmission part includes a gear and a rack, the gear comprises a plurality of first teeth extending from a periphery of the gear, the rack comprises a first rack portion extending along a third direction perpendicular to the first and second directions and a second rack portion extending along the first direction, the first rack portion connects to the second rack portion, and forms an L-shaped structure, the second rack portion defines a second axle hole extending along the second direction at a distal end thereof, the first rack portion comprises a plurality of second teeth, the first and second teeth mesh with each other, the connecting rods are rotatably attached to the supporting rods by the spindles at one side of the connecting rods rotatably fixed in the first axle holes of the supporting rods, the connecting rods are rotatably attached to the second rack portions by the spindles at the other side of the connecting rods rotatably fixed in the second axle holes of the second rack portions, the supporting rods are located between the connecting rods, and the connecting rods are located between the second rack portions.

7. The mouse of claim 6, wherein when the mouse is in the first state, the second rack portions are closest to each other, the supporting rods are closest to the bottom cover of the shell, the cap is retracted in the first through hole, and the top plate cooperates with the top cover to create the optimal surface shape of the mouse, when the mouse is adjusted to be in a second state, the gears are driven to rotate towards each other, the racks are driven to move further away from each other, when the racks move further away from each other, the racks drive the connecting rods to rotate and thus drive the supporting rods to move towards the cap along the first direction, the cap moves in unison with the supporting rods, such that the cap is lifted up and protrudes out of the shell via the first through hole, and thereby exerts a gentle force to the palm of the user and changing the shape of the hand of the user grasping the mouse.

8. The mouse of claim 7, wherein the shell further defines two second through holes at opposite sides of the first through holes, distal ends of the first rack portions protrude out of the shell via the second through holes, and some second teeth of the gears protrude out of the shell via the second through holes, when the mouse is in the first state, a portion of the first rack portion protruding out of the shell via the second through hole is the shortest, when the mouse is in the second state, the racks move further away from each other, and the portion of the first rack portion protruding out of the shell via the second through hole is the longest.

9. The mouse of claim 7, wherein the transmission mechanism further comprises a second gear which is driven by a motor, the second gear meshes with the first gear, the second gear drives the first gear to rotate, a switch of the motor controls the rotation direction of the second gear, and the switch protrudes out of the shell via a third through hole.

10. A mouse, comprising:
a main body comprising a shell with a first through hole defined in the shell;
a pop-up mechanism received in the shell; and
a cap fixed to the pop-up mechanism and movably received in the first through hole;
the cap comprising a top plate, a sidewall extending from a peripheral edge of the top plate to the pop-up mechanism along a first direction, and two fixing rods extending from an inner surface of the top plate to the pop-up mechanism along the first direction, the sidewall defines a plurality of cutouts, and openings of the cutouts opposite to the first through hole;
wherein the pop-up mechanism is configured to lift up the cap to protrude out of the shell via the first through hole and retract the cap in the first through hole, when the cap retracts in the first through hole, the cap cooperates with the shell to create the optimal surface shape of the mouse for a user to grasp, when the cap protrudes out from the shell via the first through hole, the cap exerts a force to a palm of the user and changes the shape of the hand of the user grasping the mouse.

11. The mouse of claim 10, wherein the shell comprises a top cover and a bottom cover engaging with each other to receive the pop-up mechanism, the bottom cover comprises a flat plate to slide about on a flat, stationary surface, and the top cover comprises a shape for optimally fitting the grasp of a user's hand.

12. The mouse of claim 11, wherein the top cover comprises a first end and a second end opposite to the first end, a mouse button is fixed at the first end, and the top cover defines the first through hole at the second end.

13. The mouse of claim 12, wherein the pop-up mechanism comprises a telescoping mechanism and a transmission mechanism, the transmission mechanism is configured to receive an external force, and drive the telescoping mechanism to lift up the cap such that the cap protrudes out from the shell via the first through hole along the first direction or pull down the cap such that the cap retracts in the first through hole along the first direction.

14. The mouse of claim 13, wherein the telescoping mechanism comprises two supporting rods extending along the first direction and two connecting rods, each supporting rod defines a fixing through hole extending along the first direction at a first distal end thereof and a first axle hole extending along a second direction perpendicular to the first direction at a second distal end thereof, each connecting rod comprises two parallel spindles located at opposite sides of the connecting rod, the spindles extend along a second direction perpendicular to the first direction, the cap is fixed to the supporting rods by the fixing rods of the cap fixing in the fixing through hole of the supporting rods.

15. The mouse of claim 14, wherein the transmission mechanism comprises two transmission parts, each transmission part includes a gear and a rack, the gear comprises a plurality of first teeth extending from a periphery of the gear, the rack comprises a first rack portion extending along a third direction perpendicular to the first and second directions and a second rack portion extending along the first direction, the first rack portion connects to the second rack portion, and forms an L-shaped structure, the second rack portion defines a second axle hole extending along the second direction at a distal end thereof, the first rack portion comprises a plurality of second teeth, the first and second teeth mesh with each other, the connecting rods are rotatably attached to the supporting rods by the spindles at one side of the connecting rods rotatably fixed in the first axle holes of the supporting rods, the connecting rods are rotatably attached to the second rack portions by the spindles at the other side of the connecting rods rotatably fixed in the second axle holes of the second rack portions, the supporting rods are located between the connecting rods, and the connecting rods are located between the second rack portions.

16. The mouse of claim 15, wherein when the mouse is in the first state, the second rack portions are closest to each other, the supporting rods are closest to the bottom cover of the shell, the cap is retracted in the first through hole, and the top plate cooperates with the top cover to create the optimal surface shape of the mouse, when the mouse is adjusted to be in a second state, the gears are driven to rotate towards each other, the racks are driven to move further away from each other, when the racks move further away from each other, the racks drive the connecting rods to rotate and thus drive the supporting rods to move towards the cap along the first direction, the cap moves in unison with the supporting rods, such that the cap is lifted up and protrudes out from the shell via the first through hole, and thereby exerts a gentle force to the palm of the user and changing the shape of the hand of the user grasping the mouse.

17. The mouse of claim 16, wherein the shell further defines two second through holes at opposite sides of the first through holes, distal ends of the first rack portions protrude out of the shell via the second through holes, and some second teeth of the gears protrude out of the shell via the second through holes, when the mouse is in the first state, a portion of the first rack portion protruding out from the shell via the second through hole is the shortest, when the mouse is in the second state, the racks move further away from each other, and the portion of the first rack portion protruding out from the shell via the second through hole is the longest.

18. The mouse of claim 16, wherein the transmission mechanism further comprises a second gear which is driven by a motor, the second gear meshes with the first gear, the second gear drives the first gear to rotate, a switch of the motor controls the rotation direction of the second gear, and the switch protrudes out from the shell via a third through hole.

19. A mouse, comprising:
- a main body comprising a shell with a first through hole defined in the shell;
- a pop-up mechanism received in the shell; and
- a cap fixed to the pop-up mechanism and movably received in the first through hole and the cap comprising a top plate, a sidewall extending from a peripheral edge of the top plate to the pop-up mechanism along a first direction, and two fixing rods extending from an inner surface of the top plate to the pop-up mechanism along the first direction, the sidewall defines a plurality of cutouts, and openings of the cutouts opposite to the first through hole;
- wherein the pop-up mechanism controlling the cap transitionable between: (i) a first state in which the cap protrudes out of the shell via the first through hole, the cap exerts a force to a palm of the user and changes the shape of the hand of the user grasping the mouse; and (ii) a second state in which the cap retracts in the first through hole.

* * * * *